US008051303B2

(12) United States Patent
Dastidar et al.

(10) Patent No.: US 8,051,303 B2
(45) Date of Patent: Nov. 1, 2011

(54) SECURE READ AND WRITE ACCESS TO CONFIGURATION REGISTERS IN COMPUTER DEVICES

(75) Inventors: Jaideep Dastidar, Houston, TX (US); Joshua Wyde, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 3015 days.

(21) Appl. No.: 10/165,938

(22) Filed: Jun. 10, 2002

(65) Prior Publication Data

US 2003/0229798 A1 Dec. 11, 2003

(51) Int. Cl.
*G06F 12/14* (2006.01)
*G06F 7/04* (2006.01)
(52) U.S. Cl. ......................................... 713/193; 726/16
(58) Field of Classification Search .................. 713/193; 726/16
See application file for complete search history.

(56) References Cited

U.S. PATENT DOCUMENTS

| 5,058,164 | A | * | 10/1991 | Elmer et al. .................. 713/190 |
| 5,345,413 | A | * | 9/1994 | Fisher et al. .................... 365/96 |
| 5,388,157 | A | * | 2/1995 | Austin .......................... 713/191 |
| 5,432,950 | A | * | 7/1995 | Sibigtroth ...................... 711/163 |
| 5,522,086 | A | * | 5/1996 | Burton et al. ...................... 710/9 |
| 5,657,444 | A | * | 8/1997 | Hall et al. ........................ 726/26 |
| 5,737,760 | A | * | 4/1998 | Grimmer et al. .............. 711/163 |
| 5,931,948 | A | * | 8/1999 | Morisawa et al. .............. 726/19 |
| 6,094,726 | A | * | 7/2000 | Gonion et al. ................. 713/400 |
| 6,510,522 | B1 | * | 1/2003 | Heinrich et al. ................. 726/34 |
| 6,609,201 | B1 | * | 8/2003 | Folmsbee ...................... 713/187 |
| 6,654,346 | B1 | * | 11/2003 | Mahalingaiah et al. ....... 370/235 |
| 6,785,284 | B1 | * | 8/2004 | Hagen ......................... 370/395.5 |
| 6,931,543 | B1 | * | 8/2005 | Pang et al. ..................... 713/193 |
| 7,003,676 | B1 | * | 2/2006 | Weber et al. .................... 713/194 |
| 7,174,014 | B2 | * | 2/2007 | Lee et al. ........................ 380/28 |
| 2001/0037458 | A1 | * | 11/2001 | Kean .............................. 713/193 |
| 2002/0013796 | A1 | * | 1/2002 | Byrne et al. .................. 708/200 |

FOREIGN PATENT DOCUMENTS

GB 2260431 A * 4/1993

* cited by examiner

*Primary Examiner* — Techane Gergiso

(57) ABSTRACT

The disclosed embodiments relate to a secure configuration space for a computing device. Each of the configuration resisters in a configuration space are divided into security bits and configuration data bits. The security bits are assigned a predetermined value. When reading from or writing to a given configuration register, the data in the bit positions corresponding to security bits must match the predetermined values or read/write access is denied.

21 Claims, 4 Drawing Sheets

200

15                                                0

00h
02h
04h
06h
08h
0Ah
0Ch
0Eh

Configuration Registers

Fig. 2

SECURE READ AND WRITE ACCESS TO CONFIGURATION REGISTERS IN COMPUTER DEVICES

BACKGROUND OF THE INVENTION

1. Field of the Invention

This invention relates generally to providing a secure operating environment for a computer system and, more particularly, to providing a secure way of reading from and writing to the computer system's configuration registers.

2. Background of the Related Art

This section is intended to introduce the reader to various aspects of art which may be related to various aspects of the present invention which are described and/or claimed below. This discussion is believed to be helpful in providing the reader with background information to facilitate a better understanding of the various aspects of the present invention. Accordingly, it should be understood that these statements are to be read in this light, and not as admissions of prior art.

Since the introduction of the first personal computer ("PC") over 20 years ago, technological advances to make PCs more useful have continued at an amazing rate. Microprocessors that control PCs have become faster and faster, with operational speeds eclipsing the gigahertz (one billion operations per second) and continuing well beyond.

Productivity has also increased tremendously because of the explosion in development of software applications. In the early days of the PC, people who could write their own programs were practically the only ones who could make productive use of their computers. Today, there are thousands and thousands of software applications ranging from games to word processors and from voice recognition to web browsers.

In addition to improvements in PC hardware and software generally, the technology for making computers more useful by allowing users to connect PCs together and share resources between them has also seen rapid growth in recent years. This technology is generally referred to as "networking." In a networked computing environment, PCs belonging to many users are connected together so that they may communicate with each other. In this way, users can share access to each other's files and other resources, such as printers. Networked computing also allows users to share internet connections, resulting in significant cost savings. Networked computing has revolutionized the way in which business is conducted across the world.

Not surprisingly, the evolution of networked computing has presented technologists with some challenging obstacles along the way. Large, geographically diversified computer networks are susceptible to attacks by hackers who desire to gain access to information stored on those computer networks. Such hackers are sometimes motivated by nothing more than the pride they feel when they accomplish a difficult and technically challenging goal in the face of significant efforts to repel their efforts. Sadly, however, many hackers seek to compromise network security for material gain.

The data stored on modern computer networks ranges from military and corporate secrets to personal information, including social security numbers, bank records or information about credit card accounts. This information is obviously very valuable. If a conniving hacker successfully breaks into a network environment where such data is stored, the hacker may use the data directly or sell it to others who would not hesitate to use the information to the disadvantage of its rightful owner. The theft of supposedly secure data could subject the company that stored the data to falling customer confidence resulting in declining business opportunities. Failure to adequately protect the confidential information of others can even give rise to legal liability in some cases.

The complexity of modern computer networks and the equipment that comprises those networks provides hackers with many, many avenues to access secured data. Hackers frequently seek to take advantage of operational quirks of computer hardware and software (such as browser software) that the designers of that hardware or software did not intend or foresee. Even aspects of computer equipment that are intended to provide new features and additional security give imaginative hackers opportunities to compromise network security and steal confidential data.

Configuration registers are a favorite target of the attention of malicious computer hackers. All computers have configuration registers that contain control data to govern their operation. Examples of information that may be stored in the configuration registers of a computer are (1) the location of secured areas in the computer system's memory map (i.e. locations of data that are secured from outside access); (2) control information that configures peripherals; and/or (3) control information that places the computer system in certain modes of operation and otherwise governs the operation of the computer system. Data is typically written to the configuration registers of a computer system when the computer system is initialized. Data may, however, be written to configuration registers when the computer system is in operation. Additionally, data may be read from configuration registers by users or devices desiring to know the set-up of the particular aspect of the computer's operation that is controlled by the configuration register being read.

The data stored in the configuration registers of a computer system are extremely important in controlling the overall operation of the computer system. Configuration register data also controls the behavior of the computer system as part of a networked environment. Accidental or malicious overwriting of a device's configuration registers could cause that device to malfunction or cause the computer network or bus on which the computer system is resident to also malfunction.

If a hacker gains the ability to read and/or write data to the computer systems configuration registers, he/she may wreck havoc in the computer system in a number of ways. Examples of such havoc include unlocking and accessing highly confidential data stored on the computer system, changing the operational parameters of the computer system or writing data to the configuration registers to cause the computer system to crash or otherwise compromise its operation.

Previous methods of preventing improper access to a computer's configuration registers exist, but they suffer from known weaknesses. In a first known method, a user must write a correct password to a known location or configuration register to unlock the configuration registers for read/write access. After the user has completed reading from and/or writing to the configuration registers, the user must again write to the specific location to lock the configuration registers against future read/write access. In a second known method, a key mechanism is employed in which the user must include a particular binary pattern before writing to a configuration register. The binary pattern is used as a prefix to the write data provided for that register.

Users of the first method described above (hereinafter, "Method 1") may unlock access to a device's configuration space by writing the password, perform the required reads and writes to the registers, and then lock access to that space. The problem with this method is that another user can, either accidentally or intentionally, overwrite the unlocked space while the original user is still performing their updates. To reduce the period of vulnerability, users of Method 1 may require that the unlock operation be performed for each configuration access to the device. That approach is inefficient because it requires a leading (unlock) and trailing (lock) write for every configuration access. In addition, Method 1 requires an increased number of lock/unlock reads and writes, which could be monitored by a hacker with partial access to the computer system to identify the unlock messages. The hacker may then be able to discern the password to the unlocking register, and then subsequently gain access to overwrite the configuration space of the device.

The second method referred to above (hereinafter, "Method 2") only applies to write accesses and does not provide any means of protection against unauthorized read accesses. Nonetheless, an unauthorized user could intercept the write pattern to the configuration registers and figure out the pre-fixed key. With this knowledge, the unauthorized user could subsequently overwrite the configuration space of the system.

An improved way to provide security for the configuration registers of a computer system in order to minimize the accidental or malicious reading from and/or writing to the control registers of the computer system is desirable.

BRIEF DESCRIPTION OF THE DRAWINGS

The foregoing and other advantages of the invention will become apparent upon reading the following detailed description and upon reference to the drawings in which:

FIG. 2 is a diagram showing a representation of a group of configuration registers;

DESCRIPTION OF SPECIFIC EMBODIMENTS

One or more specific embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
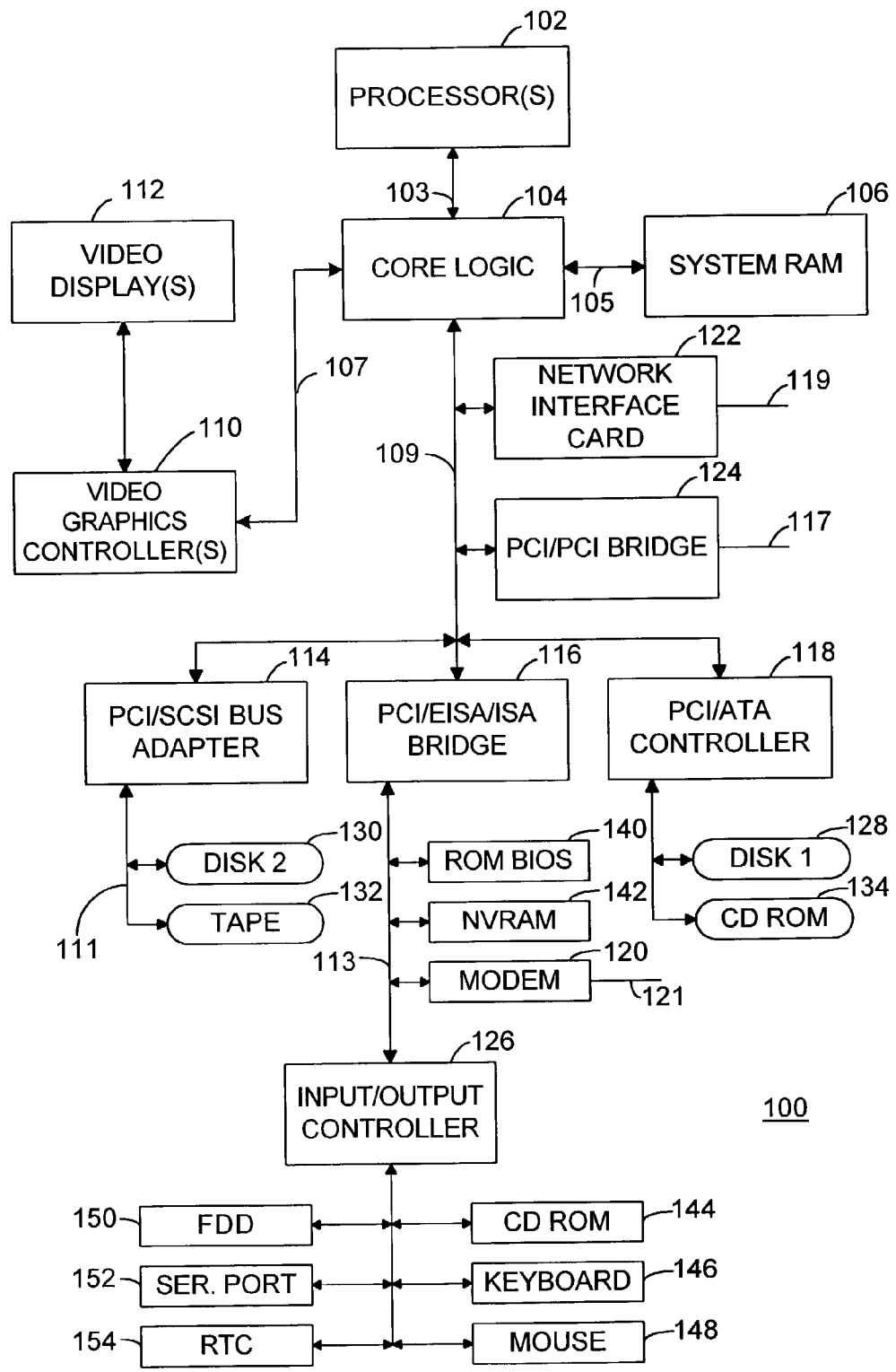
FIG. 1 is a block diagram illustrating a computer system in which the present invention may be practiced.

Referring now to FIG. 1, a schematic block diagram of a computer system utilizing the present invention is illustrated. A computer system is generally indicated by the numeral 100 and comprises a processor (or processor complex comprising multiple central processing units) 102. Also included in the computer system 100 are core logic 104 (or north bridge), system random access memory ("RAM") 106, a video graphics controller(s) 110, a video display(s) 112, a PCI/SCSI bus adapter 114, a PCI/EISA/ISA bridge 116, and a PCI/ATA controller 118. A hard drive 128 and CD ROM drive 134 may be connected to the PCI/ATA controller 118.

Single or multilevel cache memory (not illustrated) may also be included in the computer system 100 according to the current art of microprocessor computer systems. If the computer system 100 includes multiple processors, they may be arranged in a symmetric or asymmetric multi-processor configuration.

The processor 102 is connected to the core logic 104 through a host bus 103. The system RAM 106 is connected to the core logic 104 through a memory bus 105. The configuration registers of the computer system may be incorporated into the processor or in the system RAM 106 (or some combination of the two). The configuration registers may be designed to control the operation of many of the system components shown in FIG. 1.

The video graphics controller(s) 110 is connected to the core logic 104 through an AGP bus 107 (or other bus for transporting video data). The PCI/SCSI bus adapter 114, PCI/EISA/ISA bridge 116, and PCI/ATA controller 118 are connected to the core logic 104 through a primary PCI bus 109. Those of ordinary skill in the art will appreciate that a PCI-X bus or Infiniband bus may be substituted for the primary PCI bus 109. The specific protocol of the bus 109 is not a crucial aspect of the present invention.

Also connected to the PCI bus 109 are a network interface card ("NIC") 122 and a PCI/PCI bridge 124. Some of the PCI devices such as the NIC 122 and PCI/PCI bridge 124 may plug into PCI connectors on the computer system 100 motherboard (not illustrated). The PCI/PCI bridge 124 provides an additional PCI bus 117.

Hard disk 130 and tape drive 132 are connected to the PCI/SCSI bus adapter 114 through a SCSI bus 111. The NIC 122 is connected to a local area network 119. The PCI/EISA/ISA bridge 116 connects over an EISA/ISA bus 113 to a nonvolatile random access memory (NVRAM) 142, modem 120, and input-output controller 126. The NVRAM 142 may store the system BIOS and/or other programming and may include flash memory, as discussed below with respect to FIG. 2. Additionally, the NVRAM may be contained in a programmable logic array ("PAL") or any other type of programmable non-volatile storage. The modem 120 connects to a telephone line 121. The input-output controller 126 interfaces with a keyboard 146, CD-ROM drive 144, mouse 148, floppy disk drive ("FDD") 150, serial/parallel ports 152 and a real time clock ("RTC") 154. The EISA/ISA bus 113 is a slower information bus than the PCI bus 109, but it costs less to interface with the EISA/ISA bus 113.

FIG. 2 is a diagram showing a representation of a group of configuration registers. The group of configuration registers, sometimes referred to as a computer's configuration space, is generally referred to by the reference numeral 200. Eight configuration registers, each having 16 individual bits of information are depicted in FIG. 2. Each of the configuration registers is adapted to be read from and written to by other devices within the computer system (for example, the processor 102 (FIG. 1)).

Each bit of each configuration register may be programmed with either a logical low ("0") or a logical high ("1") to control the operation of some aspect of the computer system in which the register resides. Each of the configuration registers is depicted by one of the horizontal rows labeled in hexadecimal format as 00h through OEh. The sixteen bit positions of each of the configuration registers are represented by the columns 0 through 15 shown in FIG. 2. Although FIG. 2 illustrates eight configuration registers, each 16 bits in length, the number of configuration registers and the number of bits in each configuration register may vary from computer system to computer system. The number of configuration registers and the number of bits within each of the registers is not a crucial aspect of the invention.

The bits of a given configuration register may be grouped together to allow programming of information that requires more choices than either a "0" or a "1." For example, three bits may be dedicated to a function that requires one of eight program states because three bits of binary data allows for eight unique bit combinations.

The bits of the configuration registers shown in FIG. 2 are grouped into two categories: (1) configuration data bits; and (2) security bits. The configuration bits are shown as blank spaces in FIG. 2. The security bits are shown as cross-hatched spaces in FIG. 2.

Those of ordinary skill in the art will appreciate that the security bits are dispersed in a seemingly random fashion throughout the bit pattern of the configuration space shown in FIG. 2. For example, the configuration register 00h has security bits in bit positions 2, 7, 11 and 14. The configuration register 06h has security bits in bit positions 0, 4, 7 and 14. As described below, a user must know the location of each of the security bits in a given configuration register before the user may successfully read from or write to that register. The specific bit positions of the security bits in each of the configuration registers are not crucial aspects of the invention.

Figure 3:
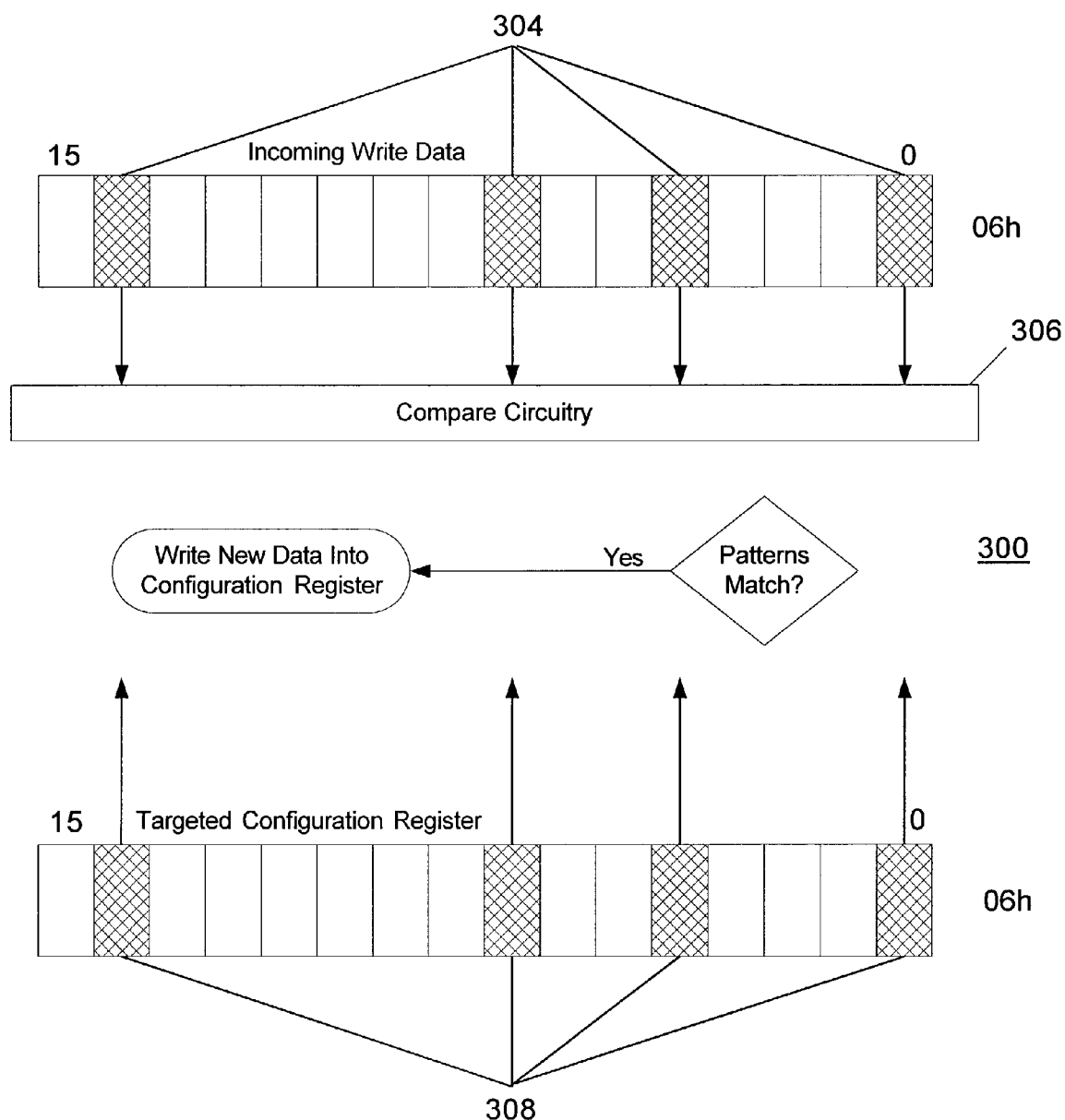
FIG. 3 is a diagram useful in explaining the secure write functionality of an exemplary embodiment of the present invention.

FIG. 3 is a diagram useful in explaining the secure write functionality of an exemplary embodiment of the present invention. The diagram is generally referred to by the reference numeral 200. At the top of FIG. 3 is one of the configuration registers from the configuration space described above with reference to FIG. 2. For purposes of example, the configuration register shown in FIG. 3 is the register located at 06h. In the example, the upper depiction of the configuration register 06h represents data that is being written to the configuration register 06h. The four security bits 304 for the configuration register 06h are located in bit positions 0, 4, 7 and 14. Configuration data occupies the remaining bit positions of the configuration register 06h.

For authorized write access, a user desiring to write to configuration register 06h must know the location of the security bits and must include predetermined data in those bit positions to successfully write to the register 06h. For example, the configuration register 06h may be implemented such that data written to it must have a "0" in bit position 0, a "1" in bit position 4, a "1" in bit position 7 and a "0" in bit position 14. A comparator circuit 306 may be implemented to determine whether the data bits in the security bit positions of the incoming data to be written to the configuration register 06h contain the correct values. For example, the comparator 306 may compare the data located in the incoming security bit positions to the corresponding data that is already stored in the configuration register 06h. If the comparator determines that the bit values contained in the security bit positions do not contain the correct values, the incoming configuration data bits are not written into the configuration register 06h. Only when all the security bits in the incoming write data match the corresponding predetermined values for the configuration register 06h will the device allow the new incoming configuration data bits to overwrite the contents of the configuration register 06h.

Figure 4:
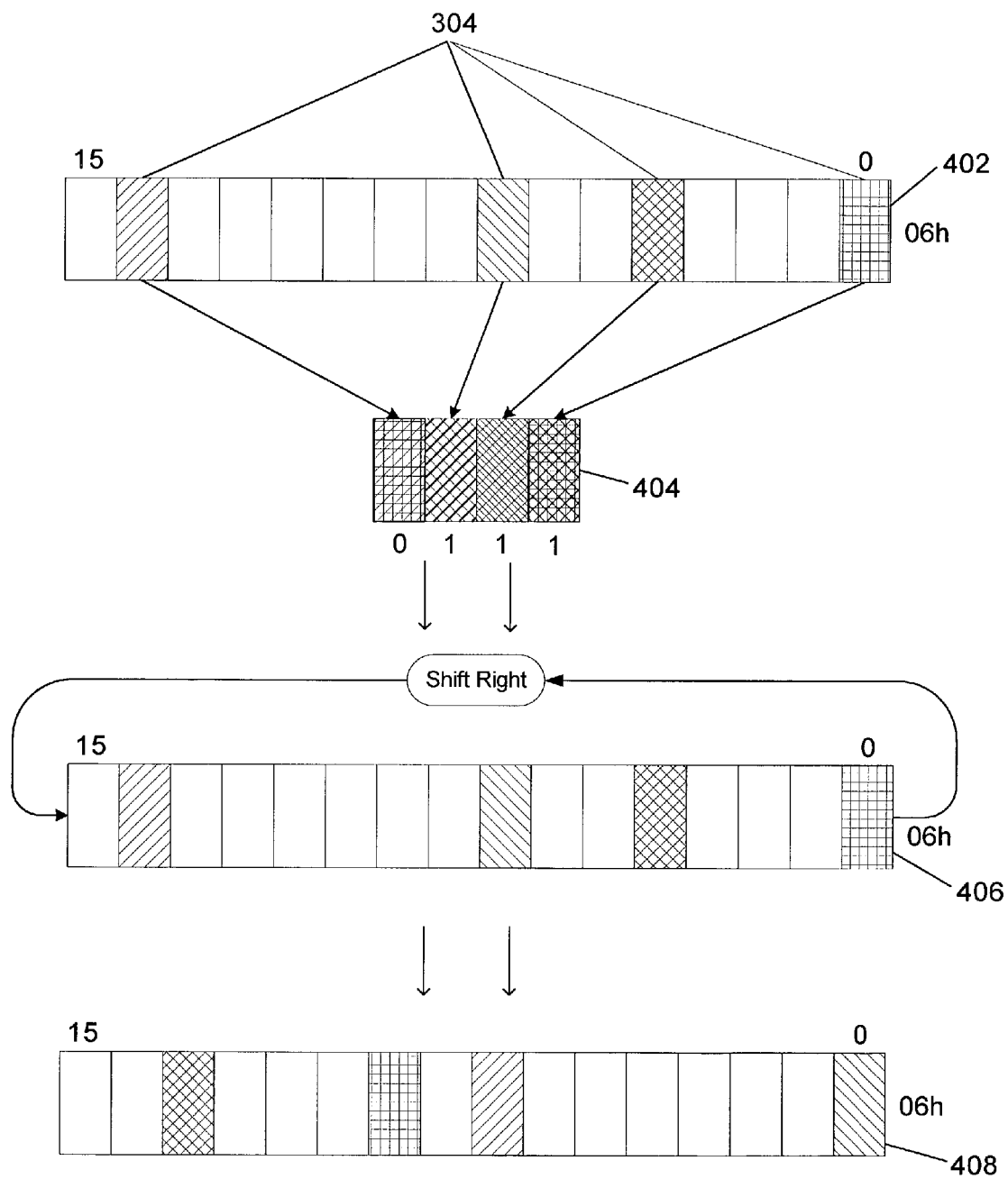
FIG. 4 is a diagram useful in explaining the secure read functionality of an exemplary embodiment of the present invention.

FIG. 4 is a diagram useful in explaining the secure read functionality of an exemplary embodiment of the present invention. The diagram is generally referred to by the reference numeral 400. A representation of the configuration register 06h is located at the top of the diagram and is identified by the reference numeral 402. The four security bits 304 are shown with different types of hatching so that they may be identified clearly when they are shown in different positions below. When a device makes a read request addressed to the configuration register 06h, the device in which the configuration register 06h is located evaluates the bits stored in the security bit positions of the configuration register 06h. The security bits from the configuration register 06h are grouped together as a unit and referred to by reference numeral 404. The security bits 404 are shown with different hatching patterns in FIG. 4 to clearly illustrate the process of reading data from the configuration register 06h.

As previously described, the security bits 404 from the configuration register 06h have a predetermined security value that must be known before read/write access may be performed on the configuration register 06h. For purposes of example, the four security bits 404 shown in FIG. 4, when read together, have a predetermined binary value of "0111," which corresponds to a decimal value of 7. Before transmitting the contents of the configuration register 06h to a device that has requested to read those contents, the device that contains the configuration register 06h rearranges the bits of the configuration register 06h based on the contents of the security bits 404. One example of this rearrangement may be transposing the bits of the configuration register in a predetermined fashion. Another example of the way bits from the configuration register may be rearranged is by shifting all of the bits of the configuration register 06h (configuration data bits and security bits) a number of places corresponding to the value of the security bits 404. The shifting of the data may be accomplished in any manner, either with hardware (such as a shift register) or software. The exact manner of shifting the bits is not a crucial aspect of the invention. In the example shown in FIG. 4, the bits are shifted to the right seven (7) places, because 7 decimal is the value of the security bits 404.

In the example shown in FIG. 4, the beginning contents of the configuration register 06h with the security bits shown in different hatching patterns is designated with the reference numeral 406. The positions of the bits of the configuration register 06h after being shifted seven (7) bits to the right is shown at 408. Those of ordinary skill in the art will appreciate that the direction bits are shifted prior to being transmitted (left or right) and exact number of bits that the contents of the configuration registers are shifted before being transmitted may vary and is not a crucial aspect of the invention.

If the device seeking to read the contents of the configuration register 06h is an authorized device, the user will know the direction and number of places that the requested configuration data has been shifted. Accordingly, the user's machine may be programmed to reverse the encoding process by shifting the received configuration data the opposite direction so that the true contents of the configuration register that has been read may be accurately viewed.

For increased levels of security, the encoding process of data read from configuration registers may be enhanced. For example, instead of linearly rotating the bits of the configuration register in a particular direction, subsets of the bits of a given configuration register may be rotated or shifted a predetermined number of bits, as determined by the contents of one or more of the security bits of that register. Also, different configuration registers or even different subsets of the same configuration register may be rotated in different directions (right or left).

Several things may be done to make both read and write accesses to the configuration registers relatively less or relatively more secure. For example, the bit patterns and bit positions of the security bits may either be the same for all configuration registers, may be common to certain groups of configuration registers or may be unique for each configuration register. Also, the number of security bits contained in each configuration register may be increased with a corresponding decrease in the likelihood of either accidental or unauthorized access to the configuration space.

The design of the configuration registers shown in the disclosed embodiments provides for in-band read/write access. In-band read/write access means that a secure access mechanism is built into the reads and writes to the configuration space. No additional information is required to perform a secure read or write of the configuration registers of the computing device. As a result, the disclosed embodiments eliminate extraneous or additional writes to lock or unlock registers in configuration space.

As an additional feature, the in-band configuration of the disclosed embodiments reduce the opportunity for accidental or malicious writing to registers in configuration space during the time between the unlocking and locking of configuration space access. This is true because each read from or write to configuration space is an integral, atomic operation containing all needed security information to access the configuration register being read or written. Thus, the disclosed embodiments minimize the opportunity for a configuration register to be overwritten, either accidentally or maliciously, while being accessed.

The disclosed embodiments allow a unique key to be assigned to each separate configuration register, if desired. This may be done by assigning a different predetermined or expected pattern of data to the security bits of each configuration register. The use of multiple security bit patterns makes unauthorized access to a particular register in a given configuration space extremely difficult without knowing the pattern of the security bits for the register in advance. For larger configuration spaces found in modern computing devices, the effort to determine the key for a given register may be prohibitive.

An additional benefit of the disclosed embodiments is that read data from configuration registers may be provided in an encrypted format. Also, the data is uniquely encrypted for each configuration register. Once again, unauthorized access to registers so protected will be extremely difficult.

While the invention may be susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives falling within the spirit and scope of the invention as defined by the following appended claims.

What is claimed is:

1. A configuration register, comprising:
the configuration register;
at least one security bit disposed at a predetermined bit position within the configuration register, the at least one security bit having a predetermined value;
at least one configuration data bit; and
wherein a write access to the configuration register is granted in response to receipt of data that matches the predetermined value in the predetermined bit position.

2. The configuration register of claim 1 wherein the configuration register is operatively coupled to circuitry that is adapted to compare the value of the at least one security bit to the predetermined value.

3. A configuration register, comprising:
the configuration register;
at least one security bit disposed at a predetermined bit position within the configuration register, the at least one security bit having a predetermined value;
at least one configuration data bit; and
wherein a data read from the configuration register is rearranged in a predetermined pattern based on the predetermined value.

4. The configuration register of claim 3, wherein data read from the configuration register is rearranged by being transposed in a predetermined pattern.

5. The configuration register of claim 3, wherein data read from the configuration register is rearranged by being shifted in a predetermined direction by a predetermined number of bit positions corresponding to the predetermined value.

6. The configuration register of claim 3, wherein at least a portion of data read from the configuration register is rearranged by being shifted in a predetermined direction by a predetermined number of bit positions corresponding to at least a portion of the predetermined value.

7. The configuration register of claim 3, wherein data read from the configuration register is rearranged by being shifted with a shift register.

8. A computer system, comprising:
a processor;
a hard drive adapted to store data and to be accessible by the processor;
a video graphics controller adapted to connect to a display;
a system random access memory adapted to be accessible by the processor; and
a configuration register adapted to be accessed by the processor, the configuration register comprising:
at least one security bit disposed at a predetermined bit position within the configuration register, the at least one security bit having a predetermined value;
at least one configuration data bit; and
wherein a write access to the configuration register is granted in response to receipt of data that matches the predetermined value in the predetermined bit position.

9. The computer system of claim 8 wherein the configuration register is operatively coupled to circuitry that is adapted to compare the value of the at least one security bit to the predetermined value.

10. The computer system of claim 8 wherein the circuitry that is adapted to compare the value of the at least one security bit to the predetermined value comprises a comparator.

11. A computer system, comprising:
a processor;
a hard drive adapted to store data and to be accessible by the processor;
a video graphics controller adapted to connect to a display;
a system random access memory adapted to be accessible by the processor; and
a configuration register adapted to be accessed by the processor, the configuration register comprising:
at least one security bit disposed at a predetermined bit position within the configuration register, the at least one security bit having a predetermined value;
at least one configuration data bit; and
wherein a data read from the configuration register is rearranged in a predetermined pattern based on the predetermined value.

12. The computer system of claim 11, wherein data read from the configuration register is rearranged by being transposed in a predetermined pattern.

13. The computer system of claim 11 wherein data read from the configuration register is rearranged by being shifted in a predetermined direction by a predetermined number of bit positions corresponding to the predetermined value.

14. The computer system of claim 11, wherein at least a portion of data read from the configuration register is rearranged by being shifted in a predetermined direction by a predetermined number of bit positions corresponding to at least a portion of the predetermined value.

15. The computer system of claim 11, wherein data read from the configuration register is rearranged by being shifted with a shift register.

16. A method of gaining write access to a configuration register in a computing device, the method comprising the acts of:

having at least one security bit disposed in a predetermined bit position within the configuration register, the at least one security bit having a predetermined value;

configuring write data to be written to the configuration register so that a data bit in the predetermined bit position of the write data is set to the predetermined value; and writing the write data to the configuration register.

17. The method of claim 16 comprising the act of comparing the value of the at least one security bit to the predetermined value whereby write access to the configuration register is granted if the value of the bit in the predetermined bit position of the write data matches the predetermined value.

18. A method of gaining read access to a configuration register in a computing device, the method comprising the acts of:

having at least one security bit disposed in a predetermined bit position within the configuration register, the at least one security bit having a predetermined value;

receiving a read request for data stored in the configuration register;

creating rearranged configuration data by rearranging data stored in the configuration register in a predetermined pattern based on the predetermined value; and sending the rearranged configuration data responsive to the read request.

19. The method of claim 18 wherein the act of creating rearranged configuration data comprises shifting the data from the configuration register in a predetermined direction by a predetermined number of bit positions corresponding to the predetermined value.

20. The method of claim 18 wherein the act of creating rearranged configuration data comprises the act of transposing the data stored in the configuration register in a predetermined pattern.

21. The method of claim 18, wherein the act of creating rearranged configuration data comprises the act of shifting at least a portion of the data in the configuration register in a predetermined direction by a predetermined number of bit positions corresponding to at least a portion of the predetermined value.

* * * * *